Figure 6:
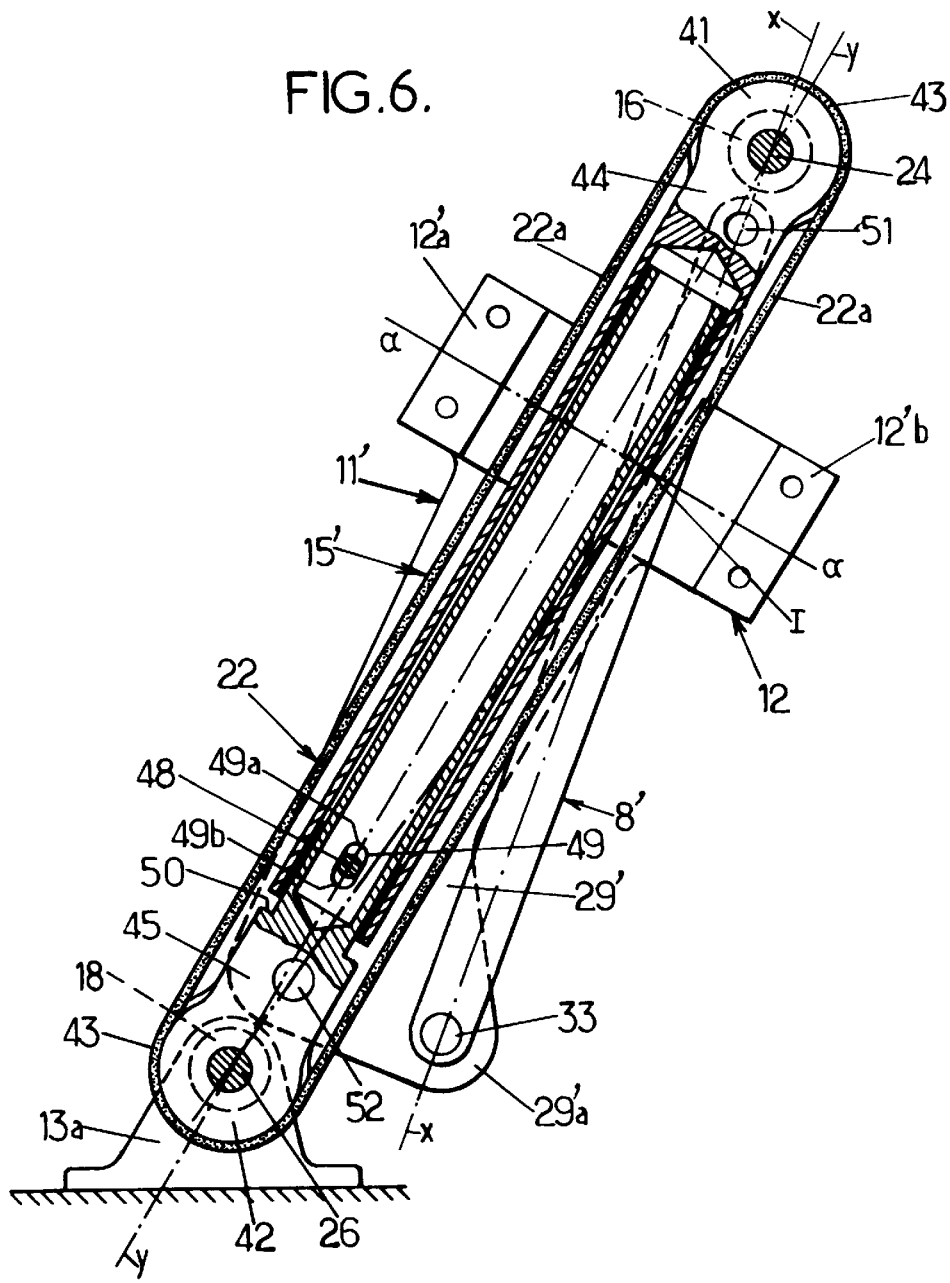

United States Patent
Certain

[19]

[11] Patent Number: 6,164,915
[45] Date of Patent: Dec. 26, 2000

[54] SIMPLIFIED ANTI-VIBRATION SUSPENSION DEVICE FOR A HELICOPTER

[75] Inventor: Nicolas Certain, Aix en Provence, France

[73] Assignee: Eurocopter, France

[21] Appl. No.: 09/298,553

[22] Filed: Apr. 22, 1999

[30] Foreign Application Priority Data

Apr. 23, 1998 [FR] France .................................. 98 05093

[51] Int. Cl.⁷ ..................................................... A47C 21/04
[52] U.S. Cl. ..................... 416/170 R; 416/500; 416/148; 416/134 A; 248/284.1; 248/274.1; 248/123.11
[58] Field of Search ................................. 416/170 R, 500, 416/244 R, 244 C, 244 D, 148, 102, 134 A, 135, 139, 140; 248/284.1, 274.1, 123.11

[56] References Cited

U.S. PATENT DOCUMENTS

| | | |
|---|---|---|
| 3,945,628 | 3/1976 | Halwes . |
| 4,431,148 | 2/1984 | Mouille . |
| 4,458,862 | 7/1984 | Mouille . |
| 5,190,244 | 3/1993 | Yana . |
| 5,782,430 | 7/1998 | Mouille . |
| 5,788,182 | 8/1998 | Guimbal . |

Primary Examiner—Edward K. Look
Assistant Examiner—Hermes Rodriguez
Attorney, Agent, or Firm—Piper Marbury Rudnick & Wolfe

[57] ABSTRACT

The anti-vibration suspension device includes at least three diagonal bars each articulated on the transmission box and on the structure by a rigid lever supporting a damping weight itself articulated to at least pivot on this structure, and, for each diagonal bar, a tension bar also articulated on the transmission box and on the structure, the corresponding lever being articulated to the structure being articulated to at least pivot on the lower end part of the corresponding tension bar, which is flexible in tension.

21 Claims, 4 Drawing Sheets

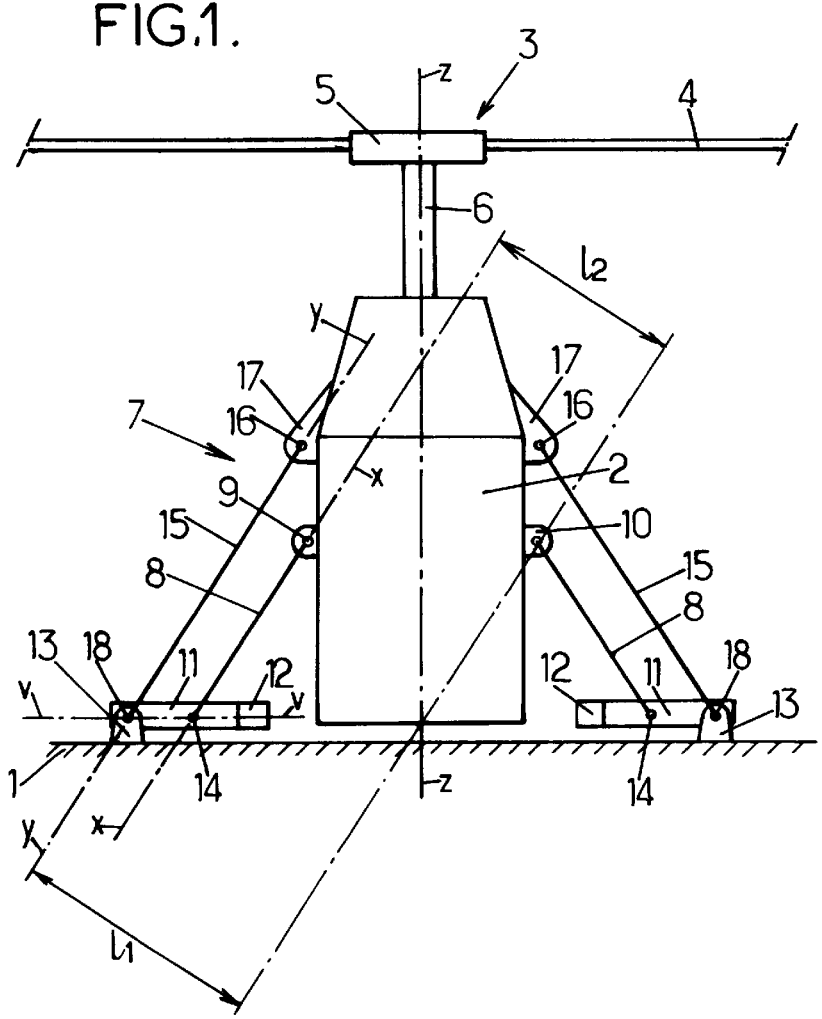
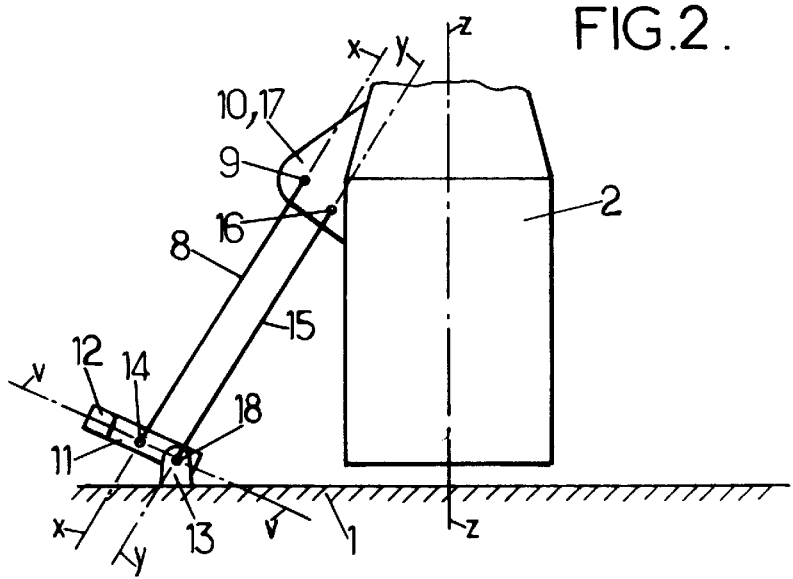

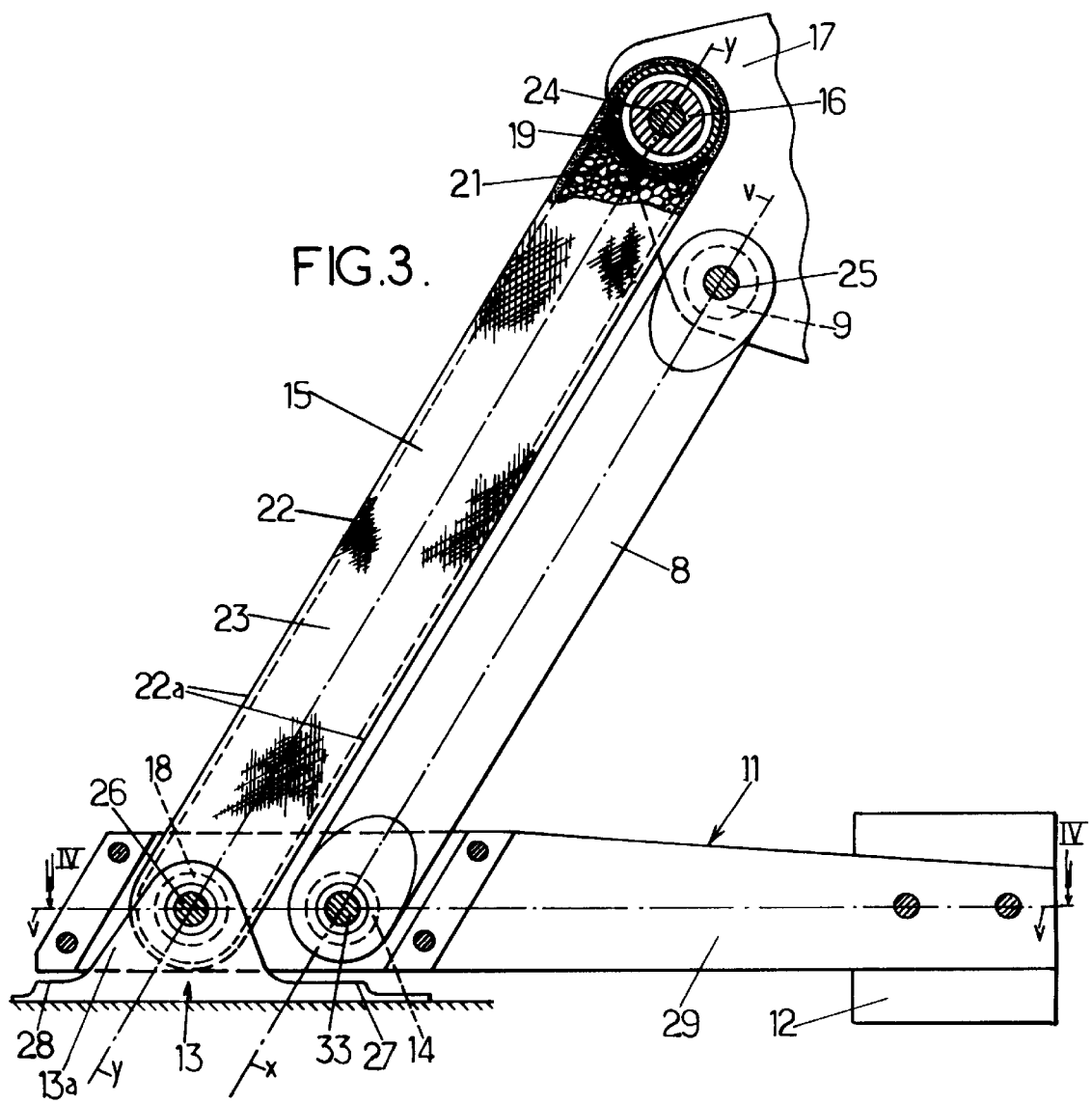
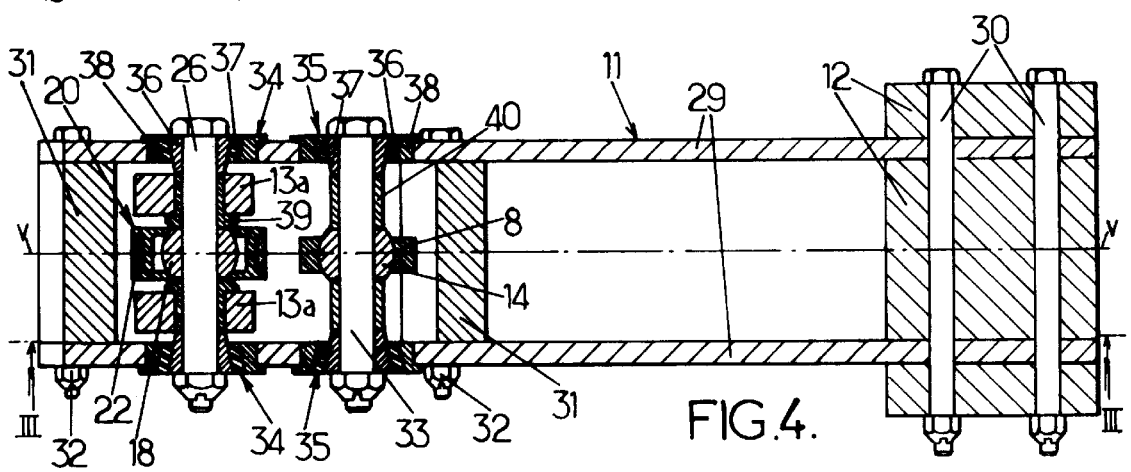

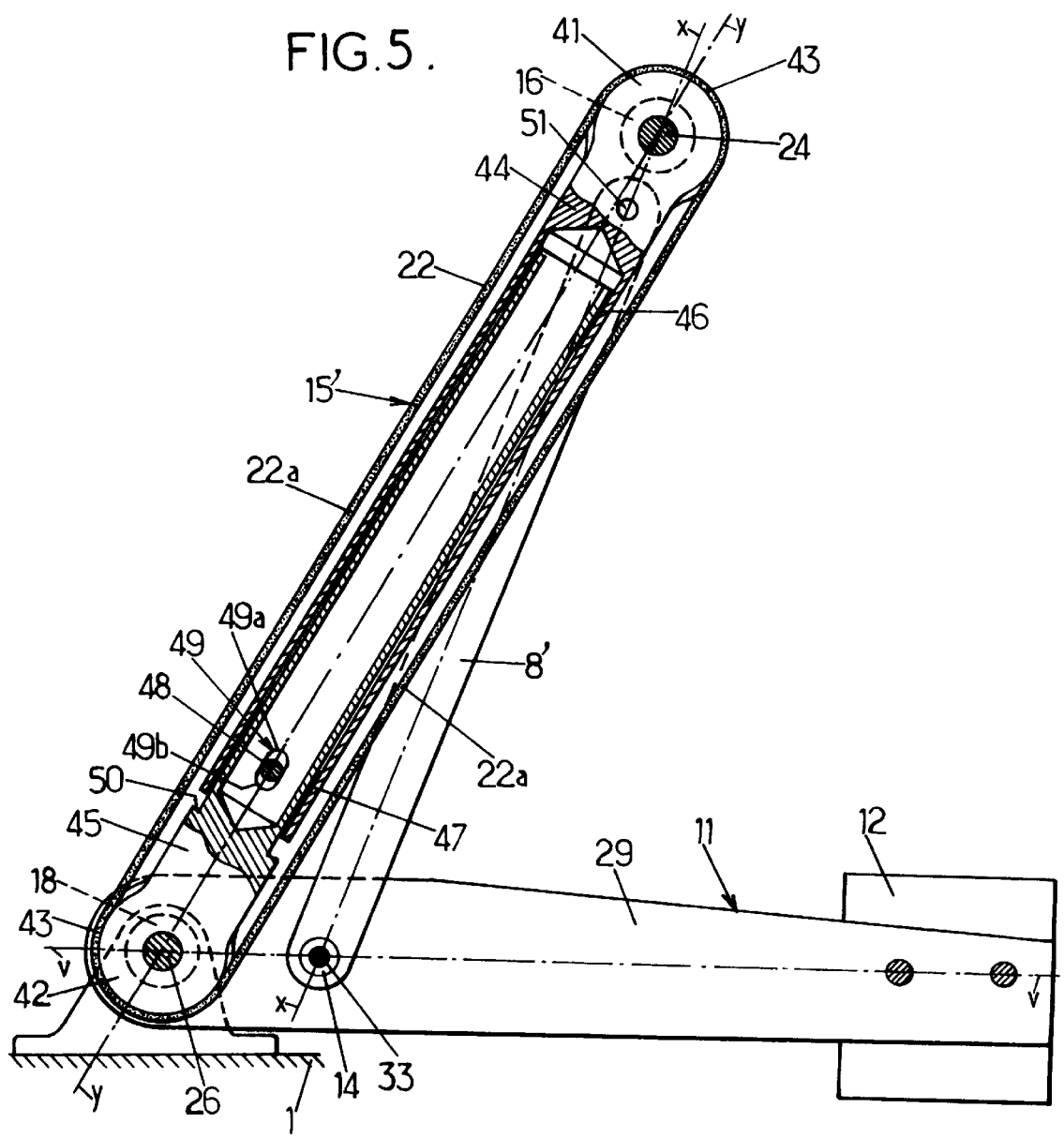

SIMPLIFIED ANTI-VIBRATION SUSPENSION DEVICE FOR A HELICOPTER

The invention is concerned with an anti-vibration, or anti-resonance, suspension device for the main rotor of a helicopter including a rotor mast, rotated by a main transmission box, around the axis of the mast which is the rotation axis of the rotor. Such an anti-vibration suspension device is intended to be fitted to a helicopter, the structure of which generally supports on a transmission support platform above the fuselage a power unit, the main rotor and the principal transmission box, acting as a reduction gear box, and located between the power unit and the main rotor to drive the latter in rotation. Such an anti-vibration suspension device is placed between the main transmission box and the helicopter structure in order to, on the one hand, provide the transmission, between the rotor and the structure, of the static loads and moments acting upon the rotor, and, on the other hand, to provide effective damping or filtering of the dynamic components of the forces and moments acting upon the rotor, particularly the dynamic component of the force along the rotor axis (surge) and the force and moment excitations in the rotor plane.

To be more precise, this invention relates to an anti-vibration suspension device of a type which includes an assembly of at least three diagonal and rigid bars supporting the transmission box on the helicopter structure, these diagonal bars being distributed around the transmission box and inclined on the rotor axis so that they converge towards one another, substantially towards a point on the rotor axis, generally on their upper end side, so that the convergence point is located between the hub, in the centre of the rotor, and the upper part of the transmission box, these diagonal bars being fastened by articulations, on the one hand, to the transmission box by their upper ends and, on the other hand, to the helicopter structure by their lower ends by means of rigid levers, which are equal in number to the diagonal bars, each lever supporting at least one damping weight at one end and being fastened by articulations to the structure by its opposite end part, near to which the lower end of the corresponding diagonal bar is articulated on the corresponding lever, the articulations connecting each lever to the structure and to the corresponding diagonal bar being at least pivot articulations around axes which are substantially perpendicular to a corresponding radial plane passing through the axis of the rotor and through the longitudinal axis of the corresponding diagonal bar.

Suspension devices of this type are made known by FR 2 474 996 and FR 2 499 505, in which each diagonal bar is articulated by its upper end directly on the upper part of the transmission box and by its lower end to the radial external end, in relation to the rotor axis, of one of arms respectively, which are equal in number to the diagonal bars and are placed radially around the base of the transmission box, to which these bars are fastened. Each arm is articulated to the structure in the area of its radial external end, which is rigid, and to which the corresponding rigid lever is fixed or integral by its opposite end to that which supports the corresponding damping weight.

In FR 2 474 996 the arms are substantially coplanar radial extensions of the central part of a suspension plate of the transmission box on the structure, this central part being integral with the bottom of the transmission box and the arms, which are arranged in a star shape around this central part, being rigid in their plane but flexible in a perpendicular direction to this plane, that is to say, in the direction of the rotor axis. Thus each arm constitutes a flexible blade between the central part of the plate fixed to the transmission box and the rigid external radial end part of the arm which is articulated on the structure and on the lower end of the corresponding diagonal bar, and to which is fixed or with which is integral the end of the lever on the opposite side to the damping weight, the lever being directed substantially radially either inwards (towards the rotor axis) or outwards. The articulations of each arm enable clearances by bending, in a perpendicular direction to the plane of its part forming a flexible blade, and the corresponding lever assembly and its damping weight forms an anti-resonance or damper system, which works by inertia and develops inertia forces, counterbalancing reactions at the points of connection to the structure corresponding to the bending of the plate's flexible blades.

According to FR 2 499 505, such an anti-resonance suspension device is simplified by the fact that the suspension plate is independent of the radial arms and is made up of a thin membrane which is able to bend in deflection under the forces exerted perpendicular to its plane or pivoting moments exerted around its centre by the transmission box, but it is rigid in tension/compression under the forces and moments exerted in its plane such as rotor drive reaction torque; this membrane being incorporated in the upper structure of the fuselage.

Each radial arm is thereby fastened directly to the base of the transmission box by an articulation around an axis perpendicular to the radial plane containing this arm, or, preferably, by a supporting bearing providing a flexible connection which confers a certain freedom of movement, both angularly and longitudinally upon the arm.

Each radial arm can be formed of a single part having, on the one hand, a flexible part, and, on the other hand, a thicker rigid part on points of which the arm is articulated to the corresponding diagonal bar and to a corresponding structural support and to which the rigid lever forming the support of the corresponding damping weight is fixed. However, according to a preferred implementation of the aforementioned patent, each radial arm is formed by a flexible radial blade and a part of a rigid lever, the other part of which constitutes the support of the corresponding damping weight, the external radial end (in relation to the rotor axis) of the blade being fixed to the rigid lever in the area in which the latter is articulated on the structural support of the fuselage. The lever is made up of two flat rectilinear pieces of iron or strutted flanges, in order to be sufficiently rigid, which frame the corresponding flexible blade as well as the ball joint articulation on the lower end of the corresponding diagonal bar.

This configuration involves the use of a complex laminated supporting bearing, in order to link the internal radial end of each flexible blade to the transmission box, which acts as a ball joint and allows the spurious movement of the internal end of the flexible blade along its longitudinal axis when this blade is distorted by bending. This configuration also involves the use of flexible blades which are difficult to size and manufacture. Moreover, the fixing between the rigid lever and the corresponding radial arm may present fretting problems.

When the rigid lever is made up of two parallel flanges, this configuration involves lastly the lever being pivoting mounted on the lower end of the corresponding diagonal bar and on the structure by pivots mounted on twin laminated conical bearings because these articulation points are acted upon by dynamic and static forces with the result that the use of cylindrical bearings would lead to obstruction by friction.

The fundamental problem caused by this invention is that this anti-vibration suspension device is simplified, in particular through the elimination of the flexible bending blades and of their complex supporting bearing on the transmission box base, in order to obtain very substantial reductions in manufacturing, installation and maintenance costs.

Another purpose of the invention is to propose a simplified anti-vibration suspension device which remains compatible with the use of a membrane according to FR 2 499 505, in order to provide the recovery of the drive reaction torque and the shear forces on the base of the transmission box while at the same time obtaining the required degrees of surge and rotation freedom; the simplified invention device being simultaneously and favourably compatible with either mondirectional or bidirectional suspensions which include a pair of identical and parallel articulated connecting rods between the bottom of the transmission box and the structure, as described in FR 2 728 538 and FR 2 728 539, enabling additional savings to be made with regard to the use of a membrane.

To this end, the invention proposes an anti-vibration suspension device of the type shown above, which is characterised in that it includes, in addition, for each diagonal bar, a tension bar which is flexible in tension and is likewise inclined on the rotor axis in the corresponding radial plane so that the tension bars converge towards one another on their upper end side, each tension bar being articulated on the transmission box by its upper end and on the helicopter structure by its lower end and the corresponding lever is fastened by articulations to the structure while at the same time being articulated to the lower end part of the tension bar, at least pivoting around an axis substantially perpendicular to said corresponding radial plane.

Such a device, in which the tension bars transmit static and dynamic forces and the diagonal bars, which are of a standard structure, solely transmit dynamic forces, has the advantage of replacing each flexible blade and every supporting bearing of prior art devices by a tension bar which is much easier to size, construct, assemble and maintain than the components it is replacing, in a device of thereby simplified architecture.

Each tension bar can be substantially parallel to the corresponding diagonal bar, in which case it is to advantage practical to have the upper ends of the tension bar and the corresponding diagonal bar articulated on the transmission box by two ball joint articulations which are separate from each other.

However, it is also possible to have each tension bar and the corresponding diagonal bar inclined towards each other on their upper end side, thereby facilitating, in a straightforward version, their articulation to the transmission box; the upper end of the diagonal bar or of the tension bar respectively is articulated on the transmission box so as to at least pivot around a pivot pin which passes through an articulation ball joint on the upper end of the tension bar or corresponding diagonal bar respectively on the transmission box. Thus the upper ends of the two corresponding diagonal and tension bars are articulated on the transmission box around a same central articulation point, which enables the number of connections to the upper part of the transmission box not to be increased. However, it remains possible that the upper ends of a diagonal bar and of the corresponding tension bar which are inclined towards each other can each be articulated directly on the transmission box by one of the two different ball joints respectively.

Each tension bar can be radially external to the corresponding diagonal bar in relation to the rotor axis, in which case it is advantageous to have the corresponding lever orientated so that the corresponding damping weight is radially inside the lever articulating on the structure and/or on the tension bar, in relation to the rotor axis.

Likewise, it is possible that each tension bar is radially inside the corresponding diagonal bar in relation to the rotor axis, in which case it is advantageous that the corresponding lever is orientated in such a way that the corresponding damping weight is radially outside the lever articulation on the structure and/or on the tension bar, in relation to the rotor axis.

According to an embodiment which is to advantage simple, light, economical, whilst at the same time remaining effective, at least one tension bar, but preferably each of them, includes a composite belt comprising a coil of reinforcement fibres formed into unidirectional rovings which are compressed into a matrix of rigidified synthetic resin, the composite belt encircling two articulation ball joint supports at the ends of the tension bar in order to articulate it on the transmission box and on a structural support of the helicopter structure.

In a first example of a composite tension bar, the two ball joint supports are separated from each other by at least one filling component in a light cellular or foam material, which is likewise encircled by the composite belt, this belt and said filling component or components being covered between the two end ball joints by a composite sheathing which includes at least one layer of reinforcement fibres rigidified by a synthetic resin.

In this instance, for safety reasons, it is advantageous to have each composite tension bar articulated by its lower end on a structural support comprising two stops, one of which is a crash stop, restricting the movement of the transmission box towards the helicopter structure by this crash stop pressing against an area of the corresponding lever in which this lever is articulated on the lower end of the corresponding diagonal bar, and of which the other stop is a tension bar rupture stop, and comes to bear against another area of the corresponding lever near the articulations of the lever on the tension bar and of the tension bar on the structure.

Thus the crash stop enables the crash forces to be passed into the corresponding diagonal bar, while the other stop enables the flight forces to be passed into this same diagonal bar in the event of the corresponding tension bar failing, i.e. in the event of the composite belt failing.

In another embodiment, in which the composite tension bar performs the functions of anti-crash and flight forces recovery member in the event of the composite belt failing, each of the two end ball joints of the tension bar is mounted to advantage into one end of one of two coaxial telescopic shafts respectively, at least one of which is tubular, and fitted into each other by their other end, between two rectilinear strands of the composite belt of this tension bar, with a telescopic movement of the two shafts which is restricted in both directions by at least two stops, at least one of which is a crash stop, restricting the thrusting of the two shafts into each other, the other stop restricting the withdrawal of one shaft out of the other, in the event of the composite belt failing.

In a simple and practical embodiment, one of the two shafts has to advantage, in their fitted parts, at least one stop pin projecting substantially radially in relation to the common axis of the shafts, which is the longitudinal axis of the tension bar, this stop pin being engaged in at least one oblong and axial opening made in the other shaft, the axial ends of which constitute one a crash and compression stop, and the other an extension stop, by engagement with the stop pin. Moreover, in order to improve the crash resistance of the device, one of the two shafts shows to advantage, in addition, a radial shoulder constituting a crash stop against which the other shaft comes to rest, following a predetermined thrusting movement of the two shafts one into the other from an initial position.

Thus the tension bar recovers the static forces in normal operation and, in addition, the total amount of flight forces in the event of the composite belt failing, and, besides, the tension bar provides the anticrash function, the corresponding diagonal bar only transmitting dynamic forces in normal operation.

To advantage, at least one lever support of a damping weight, but preferably each of them, includes two rigid flanges parallel to each other and substantially to the rotor axis, braced by at least part of the corresponding damping weight, and between which extend pivot pins of the articulations of this lever on the tension bar and on the lower end of the diagonal bar, the pivot pins being mounted on the flanges by twin bearings which can be either laminated and conical, as in the prior art, or preferably cylindrical, on account of the fact that pivot connections between the lever and the structure, on the one hand, and the lever and the diagonal bar, on the other hand, are only acted upon by dynamic forces, static forces passing into the tension bar.

In this case, at least one diagonal bar, but preferably each of them, is articulated on the two flanges of the corresponding lever by a combined ball joint and twin cylindrical or conical bearing articulation, the ball joint at the lower end of this diagonal bar being passed through by a pivot pin mounted on the flanges by this twin bearing.

In the two examples of composite tension bars shown above, it is possible that the lower end of this bar can be articulated on a support by a ball joint which is passed through by a pin held on this structural support, and the corresponding lever is articulated to pivot around this pin on the same structural support and at the lower end of the tension bar. In this case, and when the lever includes two rigid parallel flanges, it is an advantage for the pivot pin of the lever on the structural support and on the tension bar, to be mounted on the two flanges of the lever by a twin conical or cylindrical bearing.

When the composite tension bar includes two telescopic shafts, it is to advantage that the upper end of the corresponding diagonal bar is articulated to at least pivot around the one of the telescopic shafts which is articulated on the transmission box by the ball joint on the upper end of this tension bar.

In this case, the corresponding rigid lever can be orientated substantially along the longitudinal axis of the corresponding tension bar and supports the corresponding damping weight on the upper end side of the corresponding tension bar and diagonal bar, in relation to the articulation of this lever on the tension bar, around a pivot pin moved, substantially along the longitudinal axis of this tension bar, in relation to the articulation ball joint of the tension bar on the structure, and the articulation of the corresponding diagonal bar on this lever being thrown off centre in relation to the longitudinal axis of the lever. Thus it is possible to replace each diagonal bar of a conventional support device of a transmission box by an articulated assembly which includes a diagonal bar, a tension bar, a lever and a damping weight, in order to convert the conventional support device into an improved suspension device according to the invention.

It is therefore preferable, in order to avoid the introduction of spurious forces into the bars, that the articulation centres of the upper ends of the tension bar on the transmission box and of the corresponding diagonal bar on the tension bar and the articulation centre of the corresponding diagonal bar on the corresponding rigid lever are aligned in a first direction, and that the intersection of this first direction with a plane passing through the centre of gravity of the corresponding damping weight and transverse to this rigid lever is aligned with the articulation centres of the lower end of this tension bar on the structure and of this lever on this tension bar, statically.

Generally, the tension bars are not restricted, in their manufacture, to the aforementioned composite structures, but one of them at least and, preferably, each of them, can include at least one part which is able to bend resiliently under a tension load which is applied to the ends of the bar, such as a ring and/or an axial part of a progressively varying section, giving said bar tensile flexibility.

Figure 7:
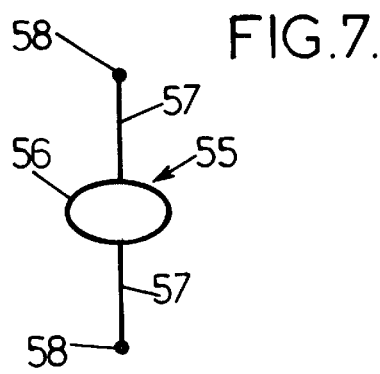
Figure 8:
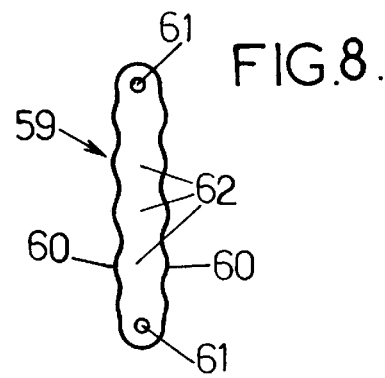

Other advantages and characteristics of the invention will spring from the description given below, in a non-restrictive way, of version examples described by reference to appended drawings in which:

FIG. 1 is a lateral elevation diagrammatic view of a first version of the suspension device according to the invention, FIG. 2 is a partial view, which is similar to FIG. 1, of a second version of the suspension device, FIG. 3 is a lateral elevation view, with partial stripping, of part of a first example of the suspension device according to the version in FIG. 1, FIG. 4 is a sectional view along IV—IV of FIG. 3, FIG. 5 is a similar view to FIG. 3, being a second example of the device according to the version in FIG. 1, FIG. 6 is a view of another version, similar to FIG. 5, and FIGS. 7 and 8 are diagrammatic views of the lateral elevations of tension bar variants which can be used in the suspension devices of the invention.

The primary structure of the fuselage of a helicopter is shown diagrammatically as 1, in FIG. 1, at the level of a transmission support platform defined by this primary structure 1 above the helicopter cabin, in order to support a power unit (not shown), a main transmission box 2 and a main rotor 3, of which the blades 4 are connected to a hub 5 integral in rotation with a rotor mast 6 which is rotated around its longitudinal axis, which is the rotor rotation axis ZZ, by its base in the transmission box 2, fitted as a reduction gear box on the kinematic chain between the power unit and the mast 6, in order to rotate the rotor 3.

The rotor 3 and the transmission box 2 are suspended on the structure 1 by a suspension device 7, which filters the surge excitations (along ZZ) and the excitations due to forces and moments in the plane of the rotor 3. This suspension device 7, like similar devices described in FR 2 474 996 and FR 2 499 505, includes an assembly of four rigid and diagonal bars 8, which are rectilinear, and the longitudinal axis xx of each of which extends substantially into one of four radial half-planes respectively passing through the axis ZZ and distributed around this axis ZZ (at 90° from one another), so that two half-planes are orientated forwards and towards the helicopter sides, and the other two half-planes are orientated backwards and sidewards, the four half-planes each being thus inclined around 45° on the longitudinal axis of the helicopter. The bars 8 are inclined in these half-planes so as to converge towards each other, on their upper end side, towards a focal point located substantially on the axis ZZ, below the hub 5. Each diagonal bar is connected in an articulated way by its upper end to the upper part of the casing of the transmission box 2, for example by an articulation ball joint 9, which is held between two fastening flanges 10 projecting radially on the casing of the box 2, and by its lower end to the structure 1, by means of a rigid rectilinear lever 11, the longitudinal axis of which w extends substantially radially in relation to the axis ZZ in the same radial plane which contains the axis xx of the diagonal bar 8, and which supports a damping weight 12 at its end turned towards the axis ZZ, whilst the lever 11 is articulated, by its opposite end part, on a structural support 13 of the fuselage primary structure 1, so that it can at least pivot around an axis substantially perpendicular to the radial plane containing the axes xx and w of the diagonal bar 8 and the lever 11.

Although it is not shown exactly in FIG. 1, the lower end of each diagonal bar 8 is articulated, with the help of a ball joint 14, on an area of the lever 11 which is nearer to the articulation of this lever 11 on the structural support 13 than to the damping weight 12, and which is even located near the articulation of the lever 11 on the structural support 13, i.e. near the external radial end part of the lever 11 in relation to the axis ZZ.

The essential special feature of the anti-vibration or anti-resonance suspension device of the invention is that it includes, for each diagonal bar 8, a tension bar 15, which is flexible in tension and rectilinear, the longitudinal axis of which yy substantially extends into the radial plane containing the longitudinal axes xx and w of the corresponding bar 8 and lever 11. The tension bars 15 are likewise inclined on the axis ZZ so as to converge towards one another on their upper end side, by which the bars 15 are each directly articulated on the casing of the upper part of the transmission box 2 by an articulation ball joint 16 held between two fastening flanges 17 projecting radially on this casing, whilst the lower end of each tension bar 15 is articulated on the corresponding structural support 13 by a ball joint articulation 18 centred on a pivot axis of the articulation of the lever 11 on this same structural support 13.

Each monodirectional anti-resonance damper, made up of a lever 11 with its damping weight 12, is thus articulated on the lower end part of the corresponding tension bar 15, to at least pivot around an axis which is substantially perpendicular to the corresponding radial plane which contains the axes xx, yy and w of the bars 8 and 15 and of the lever 11.

Each tension bar 15 in FIG. 1 is substantially parallel to the corresponding diagonal bar 8 and is arranged radially outside this diagonal bar 8, in relation to the axis ZZ, and the upper ends of the bars 8 and 15 are articulated directly on the transmission box 2 by separate ball joints 9 and 16, which are held respectively by fastening flanges 10 and 17 which are either separate or otherwise. The corresponding lever 11, is articulated on the lower ends of the bars 8 and 15, being transversally orientated in relation to these bars so that its damping weight 12 is radially inside the articulations of the lever 11 on these bars 8 and 15.

However, as shown in FIG. 2, in which the same references denote similar components, each tension bar 15 can be radially inside the corresponding diagonal bar 8, in relation to the axis ZZ, and the corresponding lever 11, which is likewise transversal in relation to bars 8 and 15, can be orientated so that its damping weight 12 is radially outside the articulations of the lever 11 on the lower ends of the bars 8 and 15 and on the structural support 13, in relation to the axis ZZ. Likewise, in this configuration, in which the two corresponding bars 8 and 15 are substantially parallel to each other, but could be inclined towards each other on their upper end side, as in the examples described below which refer to FIGS. 5 and 6, the upper ends of bars 8 and 15 are articulated by two separate ball joints 9 and 16 between two large fastening flanges 10 or 17 on the upper part of the transmission box 2 casing.

In devices according to FIGS. 1 and 2 the tension bars 15 transmit static and dynamic forces. Dynamic forces are transmitted by the diagonal bars 8 to the damping weights 12. These damping weights 12 which are thus acted upon, develop, by means of their lever 11 on the structural supports 13, on which the levers 11 are articulated, dynamic forces opposed to the dynamic reactions applied on these structural supports 13 by the dynamic loadings transmitted by the tension bars 15 and originating from the rotor 3 and the transmission box 2, in order to filter these excitations.

The example of FIGS. 3 and 4, corresponding to the configuration in FIG. 1, combines a metal diagonal bar 8, for the transmission of dynamic forces, to a first example of a tension bar 15 which is essentially in composite materials. This tension bar 15 includes two upper end 16 and lower end 18 ball joints, which are each crimped in a corresponding support, which is made up of shouldered socket 19 or 20, at each end of a lengthened block 21 of low density synthetic foam or cellular material, making a filing component. The filling component 21 and the two sockets 19 and 20, containing the ball joints 16 and 18, are encircled by a composite belt 22 made up of a coil of unidirectional rovings of type R glass fibre compressed into a matrix made up of a rigidified impregnation synthetic resin, with a fibre ratio in the coil of about 25%, for example. The use of rovings of reinforcement glass fibres type E or S is also possible. Between the two ball joints 16 and 18, the assembly made up of the filling component 21 and the two rectilinear, parallel and opposite strands 22*a*, of the belt 22, encircling it, is stabilised by a composite sheathing 23, which comprises two superposed folds of glass fibre fabric which are, for example, crossed at around ±30°, i.e. in such a way that the orientation of the warp yarn of these fabric folds are inclined at around 30° on one side by one fold and at around 30° on the other side for the other fold in relation to the longitudinal axis yy of the tension bar 15, to which this composite structure gives good tensile flexibility, these two fabric folds being agglomerated together and to the underlying structure of the component 21 and of the belt 15 by a rigidified impregnation synthetic resin, which is preferably the same resin as that of the belt 15 or a resin compatible with it. This composite tension bar 15 is placed substantially parallel to the corresponding diagonal bar 8, between a structural support 13 and the casing of the transmission box 2, on which the tension bar 15 is articulated by its upper ball joint 16 which is passed through by a retaining pin 24 between the two fastening flanges 17 of the box 2, between which a retaining pin 25 of the ball joint 9 is also fixed to upper end of the bar 8, the two pins 24 and 25 being substantially perpendicular to the radial plane containing the axes xx and yy of the bars 8 and 15. The ball joint 18 on the lower end of the bar 15 is passed through by a pin 26 retaining this ball joint 18 on the two flanges 13*a* of a fitting constituting the structural support 13 connecting to the helicopter structure, this pin 26 at the same time being the pin of a pivot articulation of the corresponding rigid lever 11 on these same fitting flanges 13*a*.

This structural fitting 13 has, on both sides of its fastening flanges 13*a* and in a radial direction in relation to the axis 77, two stop surfaces 27 and 28, one of which 27, radially inwards, is located under the part of the rigid lever 11 on which the diagonal bar 8 is articulated, whilst the other 28, in a radial external position, is located under the external radial end of the lever 11, on the opposite side to the lower end of the bar 8 in relation to the articulation of the tension bar 15 on the fitting 13. The first stop 27 is a crash or anticrash stop, which restricts the movement of the transmission box 2 and the rotor 3 towards the helicopter structure 1 by making the lever 11 come into contact against this stop 27, which causes the crash forces to pass into the diagonal bar 8, because the tension bar 15 is designed to have great tensile strength but to offer only low compression strength.

The other stop 28 enables, through contact with the external radial end of the rigid lever 11, flight forces to be passed into the diagonal bar 8 in the event of the composite belt 22 of the tension bar 15 rupturing, which therefore does not perform a vital function. This second stop 28 is therefore a breaking stop for the tension bar 15, near the articulations of the lever 11 on this bar 15 and of this bar 15 on the fitting 13.

In this example, as in those of FIGS. 5 and 6 described below, the lever 11 connected to the bars 8 and 15 is made up of two rigid flanges 29 which are substantially parallel to each other and to the radial plane substantially containing the longitudinal axes xx, yy and w of the bars 8 and 15 and of the lever 11, these two flanges 29 being integrally braced to each other, and in particular, on their end side bearing the damping weight 12, by the central part of this weight 12 which is fixed on the corresponding ends of the two flanges 29 by two bolts 30. On either side of the articulations of the bars 8 and 15 on the lever 11 and between the flanges 29 of this lever 11, the flanges 29 are likewise fixed by braces such as 31, which are arranged between the flanges 29 and fixed to the latter by bolts 32 passing through them. Likewise the pin 26 extends between the flanges 29, articulating the lever 11 and the tension bar 15 on the fitting flanges 13*a*, as does a pin 33 of the combined ball joint 14 and twin bearing 35 articulations of the diagonal bar 8 on the two flanges 29. The pins 26 and 33 are parallel to each other and perpendicular to the radial plane containing the longitudinal axes xx, yy and w of the bars 8 and 15 and of the lever 11, and these pins 26 and 33 are pivot pins each being mounted on the flanges 29 by a twin laminated and conical bearing 34 or 35. These twin bearings 34 and 35 are of a well known structure and each one includes two conical laminated bearings each of which comprises a tapered vulcanised elastomer ring 36 around the tapered race of a central metal ring 37 encircling a cylindrical end of the pin 26 or 33, the elastomer ring 36 being also vulcanised inside a tapered race of an external metal shouldered ring 38 which is held in a corresponding bore of a flange 29, and the laminated conical bearings of the twin bearing 34 are mounted in the flanges 29 outside the two fitting flanges 13*a* passed through by the bolted pin 26 with the interpositioning of shouldered cylindrical rings 39 between which the ball joint 18 is mounted on the lower end of the tension bar 15. In the same way the laminated conical bearings of the twin bearing 35 provides the pivoting mounting of the flange 29 around the ends of the pin 33 which is bolted on the flanges 29 and which passes through the ball joint 14 at the lower end of the corresponding diagonal bar 8, this ball joint 14 being arranged between two brace rings 40 positioning it in relation to the twin bearing 35.

However, since the connections pivoting around the pin 26, between the flanges 29 of the lever 11 and the fitting flanges 13*a*, and around the pin 33, between the diagonal bar 8 and the flange 29 of the lever 11, are only acted upon by dynamic forces, whereas static forces pass into the tension bar 15, the laminated conical twin bearings 34 and 35 can be replaced, alternatively, by smooth cylindrical twin bearings, with rings which, preferably, have a an anti-frictional coating, PTFE fabric for example, which again reduces the cost in relation to similar prior art devices.

Therefore the lever 11 is stopped by the base of its two flanges 29, on either side of the fitting flanges 13*a*, against the anti-crash stop 27, in order to protect the tension bar 15 from compression, since this bar is only designed to work in tension, or against the other stop 28 of the fitting in the event of the belt 22 of the tension bar 15 failing.

FIG. 5 shows a second example which is substantially in accordance with the configuration in FIG. 1, which is distinguished from the first example in FIGS. 3 and 4 by three fundamental differences relative to the structure of the composite tension bar 15', to the fact that this bar 15' and the corresponding diagonal bar 8' are no longer substantially parallel but inclined towards each other on their upper end side and, lastly, to the articulation of the upper end of the diagonal bar 8' no longer directly on the transmission box 2, but on the upper end part of the tension bar 15'.

As regards the structure of the tension bar 15', this bar includes a composite belt 22, identical to that in the previous example, which encircles the supports of ball joints such as 16 and 18 at the upper and lower ends of the bar 15'. Each of these two ball joints is mounted in a corresponding upper 41 or lower 42 end clevis, each having an outer groove 43 in which is embedded the composite belt 22, which has been previously formed and rigidified, for example by polymerisation, if the resin for agglomerating the rovings of reinforcement fibres is a thermosetting resin, for example of the epoxy type. Each of the end clevises 41, 42 is at one end of one of two coaxial tubular shafts 44 and 45 respectively, which are fitted into each other by their other end, and are coaxial and telescopic with restricted bidirectional movement. More exactly, the clevis 41 of the upper end ball joint 16 is shaped at the upper end of a tubular outer shaft 44, into which is fitted coaxially along the axis yy the upper end and the larger part of the length of an inner tubular shaft 45, the lower end of which is shaped as the clevis 43, which receives the ball joint 18 on the lower end of this tension bar 15'. The parts of the two shafts 44 and 45 which are fitted into each other have two areas for sliding guidance, formed by anti-friction sheathing 46 and 47 made by layers of PTFE fabric which are rolled and set around the upper and lower ends of the inner shaft 45 part which is fitted into the outer shaft 44. In the parts of the shafts which are fitted into each other, near the lower end of the inner shaft 45, the outer shaft 44 is integral with a diametrical stop pin 48, passing through two oblong ports 49 which are provided axially in diametrically opposite parts of the inner shaft 45. When the tension bar 15' is in its initial and normal service position, the two shafts 44 and 45 are fitted into each other so that the pin 48 of the outer shaft 44 is not in contact with any end of the ports 49 of the inner shaft 45. In the event of the composite belt 22 failing, the two shafts 44 and 45 can only be slid telescopically in extension, the inner shaft 45 tending to come out of the outer shaft 44, until the stop pin 48 abuts against the upper end 49*a* of the oblong ports 49. This end 49*a* of the ports 49 is thus an extension stop or flight forces recovery stop by the bar 15' in the event of its belt 22 failing, whilst the lower end 49*b* of the ports 49 forms a compression and crash stop, which restricts the two shafts 44 and 45 from fitting into each other and protecting the tension bar 15' against compression. In the event of the stop pin 48 failing when supported against the lower end 49*b* of the oblong ports 49, the tension bar 15' is protected against crashing by a second anti-crash or anti-crash stop made up of a shoulder 50 which projects radially outwards on the lower end part of the inner shaft 45, against which the lower end of the outer shaft 44 abuts.

The anti-crash and flight forces recovery functions, in the event of the composite belt 22 failing, are integrated into the tension bar 15' in FIG. 5. In this example, the damping weight 12 is supported by a lever 11 including two flanges 29, as in the example in FIGS. 3 and 4, which are articulated, on the one hand, to the lower end of the diagonal bar 8', by a complex ball joint and twin cylindrical or conical and laminated bearing articulation, around a pin 33 and, on the other hand, on the lower end of the tension bar 15' and on the fitting flanges 13a by a cylindrical or conical and laminated twin bearing which encircles a pivot pin 26 passing through the ball joint 18 of the lower end of the bar 15', as is shown in FIG. 4.

As aforementioned, the upper end of the diagonal bar 8', which is sized solely to transmit dynamic forces in normal operation, is articulated on the upper end part of the outer shaft 44, by a pivot articulation around a pin 51 perpendicular to the radial plane containing the longitudinal axes xx, yy and w of the bars 8' and 15' and of the lever 11, this pin 51 being centred on the longitudinal axis xx of the bar 8', between the pins 33 and 24 ensuring respectively that the ball joint 14 of the lower end of the bar 8' is held on the lever 11 and that the ball joint 16 of the upper end of the bar 15' is held between the two fastening flanges, such as 17 (FIGS. 1 and 3) on the transmission box 2. For this reason the upper end part of the diagonal bar 8' is formed into a clevis or into a U, the two branches of which extend on both sides of the upper end of the outer shaft 44 and are joined to this shaft 44 by a pivot connection around the pin 51 with a twin cylindrical or conical bearing, if required, such as 35 as in FIG. 4. The alignment of the pins 33, 51 and 24 in a same plane passing through the longitudinal axis xx of the bar 8', inhibits the introduction of spurious moments in the tension bar 15'.

Alternatively, the upper end of the bar 8' can be articulated by a pivot connection around the pin 24 passing through the ball joint 16 which articulates the upper end of the bar 15' on the transmission box.

According to another variant which resembles FIG. 1, the bar 8', although inclined toward the bar 15' on its upper end side, is articulated directly on the transmission box by a ball joint at its upper end.

The example in FIG. 6 is a variant of that in FIG. 5 and also comprises a tension bar 15' with two telescopic shafts 44, 45 supporting two ball joint articulations 16, 18 at their ends and integrating a compression stop 49b, an extension stop 49a and an anti-crash stop 50, as described above when referring to FIG. 5. In the same way, the example in FIG. 6 comprises a diagonal bar 8' inclined towards the tension bar 15' on its upper end side by which the diagonal bar 8' is articulated to pivot around the pin 51 on the upper end part of the bar 15', whilst the lower end of the bar 8' is articulated by a complex ball joint and cylindrical or conical twin bearing articulation, around a pin 33, between the two flanges 29' of a lever 11' supporting a damping weight 12'.

Therefore we are restricted in the description of the main differences of the example given in FIG. 6 in relation to that given in FIG. 5 hereafter.

The lever 11' is orientated substantially along the longitudinal axis yy of the bar 15' (the axis is common to the telescopic shafts 44 and 45 of this bar 15'), so that this bar 15' and the bar 8' extend substantially between the two flanges 29' of the lever 11', which supports the damping weight 12', which is sub-divided into two halves 12'a and 12'b, each being bolted on the flanges 29' on both sides of the two rectilinear strands 22a of the composite belt 22 of the bar 15', with a clearance (transversally to the longitudinal axes xx and yy of the bars 8' and 15') which permits relative angular deviations of the half-weights 12'a and 12'b and of the flanges 29' of the lever 11' in relation to the two bars 8' and 15'. The damping weight 12' is supported on the upper end side of the bars 8' and 15', in relation to the articulation of the lever 11' on the bar 15', which is no longer a pivoting articulation around the pin 26 holding the ball joint 18 of the lower end of the bar 15' on the fitting flanges 13a, as in FIG. 5, but is a pivot articulation on the lower end part of the shaft 45, lower and inside, of the tension bar 15', around a pivot pin 52 parallel to the pivot pin 51 and shifted substantially along the longitudinal axis yy of the bar 15', from the pin 26 towards the pin 24 at the other end of the bar 15', and at the same time slightly brought off centre in relation to the longitudinal axis yy of the bar 15', on the side of this pin turned towards two hasps 29'a of the flanges 29', forming a clevis inside which the ball joint of the lower end of the bar 8' is held by the pin 33, being thus thrown off centre in relation to the longitudinal axis of the lever 11'. Moreover, as in FIG. 5, the articulation pins 24, 51 and 33 are centred on the longitudinal axis xx of the bar 8', so that the centres of articulations of the bar 8' on the lever 11' and on the bar 15' and of the bar 15' on the transmission box are aligned in a same direction given by the longitudinal axis xx of the bar 8'. Moreover, the pin 52 of the pivot articulation of the lever 11' on the bar 15' is positioned and the weight 12' is arranged so that the point I at the intersection of the longitudinal axis xx of the bar 8' with the plane αα perpendicular to the longitudinal axis of the lever 11' and passing through the centre of gravity of this weight 12', is a point aligned with the articulation centres at the level of the pins 52 and 26, in a second direction inclined on the longitudinal axis xx of the bar 8' in a static position. This geometric arrangement avoids, in particular, the loading of the pin 26 articulation by moments which are capable of introducing spurious forces.

The articulated assembly in FIG. 6 can replace a similar assembly of an anti-resonance suspension device of the prior art, due to the fact that this assembly is articulated by the ball joints 16 and 18 on the upper and lower ends of the tension bar 15' on fastenings which are available, on the one hand, on the transmission box, and, on the other hand, on the helicopter structure, since the corresponding diagonal bar 8' is articulated between the lever 11' and the tension bar 15' and that this lever 11' is also articulated, at its opposite end to the damping weight 12', on the tension bar 15'.

In the various examples described above it is established that the lever supporting the damping weight can be orientated in substantially any direction in the radial plane passing through the longitudinal axes of the two corresponding diagonal bar and tension bar, that is to say, either transversally or substantially perpendicular to these axes or substantially parallel to the axis of the tension bar. Moreover, the centre of articulation of the upper end of the corresponding diagonal bar is not constrained in any way regarding its position in the corresponding radial plane, contingent upon structural complications which can arise therefrom for the appropriate articulation of the diagonal bar either independently and directly on the transmission box, or around the same centre of articulation as the upper end of the corresponding tension bar on this transmission box, or else on the upper end part of the corresponding tension bar, with the help of articulation clevises, the forms of which can be complex.

FIGS. 1 and 2 show that the arrangement of the tension bar 15 radially outside or inside the corresponding tension bar 8, and therefore the corresponding position of the articulation in 9 of the diagonal bar 8 in relation to the articulation in 16 of the tension bar 15 on the transmission box 2, has little effect on surge filtration, and that its effects on the rotation of the point at the intersection of the axis ZZ and of the bottom of the transmission box 2 are in a relationship of around L2/L1, where L1 and L2 are the lever arms of the forces conveyed by the bars 15 and 8 in relation to this point on the bottom of the transmission box, as shown in FIG. 1.

In the devices shown in FIGS. 1 to 6 the metal or composite tension bars 15 and 15' are rectilinear with fundamentally rectilinear edges.

However, as shown in FIGS. 7 and 8, other version variants are possible in order to obtain the required tensile flexibility.

In particular, the tension bar 55 in FIG. 7 can also comprise a circular or oval ring 56, which is radially able to bend resiliently and with which are integral two radial and diametrically opposite tension rods 57, rigid or flexible in tension, and which are fitted at their free end with articulation ball joints 58 similar to the ball joints 16 and 18 in previous examples, so that, through tension on the rods 57, the ring 56 bends and gives the bar 55 the required tensile flexibility.

Alternatively, the tension bar 59 in FIG. 8 is a bar with a rectilinear axis, the edges 60 of which are rippled between its two ends equipped with articulation ball joints 61, so that the bar 59 has successive axial section portions 62 which are progressively open-ended and repeated, giving the bar 59 its tensile flexibility through resilient axial bending.

The anti-resonance suspension devices according to the invention are compatible with required complementary means, in particular, for the transmission to the fuselage structure of the reaction to the engine torque on the transmission box whilst at the same time allowing small vertical movements and angular oscillations of the transmission box around axes located in the plane of the bottom of this transmission box, these complementary means being a suspension membrane integral with the bottom of the transmission box on the one hand and, on the other hand, with the fuselage structure around this box, as in FR 2 499 505, or again, devices having a pair of identical and parallel connecting rods articulated between the base of the transmission box and the fuselage structure by means of a torsion tube, if required, or of a lever combined with resilient return movement means, as described in FR 2 728 538 and FR 2 728 539, which proposed to have, between the upper fuselage structure and the bottom of the main transmission box, a connection which has great rigidity in the plane of this upper-structure.

What is claimed is:

1. An anti-vibration suspension device for a helicopter main rotor including a rotor mast rotated by a main transmission box around an axis of the mast which is the rotation axis of the rotor, the suspension device including at least three diagonal and rigid bars supporting the transmission box on a structure of the helicopter, the diagonal bars being distributed around the transmission box and inclined on the rotor axis so that said diagonal bars converge towards one another on their upper end side, substantially towards a point on the rotor axis, the diagonal bars being connected in an articulated way, on the one hand, to the transmission box by their upper ends and, on the other hand, to the helicopter structure by their lower ends and by means of rigid levers which are equal in number to the diagonal bars, each lever supporting at least one damping weight at one end and being connected in an articulated way to the structure by an opposite end part, near to which the lower end of a corresponding diagonal bar is articulated on the corresponding lever, the articulations connecting each lever to the structure and to the corresponding diagonal bar being at least pivot articulations around axes which are substantially perpendicular to a corresponding radial plane passing through the rotor axis and through the longitudinal axis of the corresponding diagonal bar wherein the device further includes for each diagonal bar a flexible tension bar, which is flexible in tension and is likewise inclined on the rotor axis in the corresponding radial plane so that the tension bars converge towards one another on their upper end side, each tension bar being articulated by its upper end on the transmission box and by its lower end on the helicopter structure, and the corresponding lever is fastened by articulations to the structure while at the same time being articulated to the lower end part of the tension bar, at least pivoting around an axis which is substantially perpendicular to the corresponding radial plane.

2. A suspension device in accordance with claim 1, wherein each tension bar is substantially parallel to the corresponding diagonal bar.

3. A suspension device in accordance with claim 1, wherein each tension bar and the corresponding diagonal bar are inclined towards each other on their upper end side.

4. A suspension device in accordance with claim 1, wherein each tension bar is radially outside the corresponding diagonal bar in relation to the rotor axis and the corresponding lever is orientated in such a way that the corresponding damping weight is radially inside the articulations of the lever on the structure and on the tension bar in relation to the rotor axis.

5. A suspension device in accordance with claim 1, wherein each tension bar is radially inside the corresponding diagonal bar in relation to the rotor axis and the corresponding lever is orientated so that the corresponding damping weight is radially outside the articulations of the lever on the structure and on the tension bar in relation to the rotor axis.

6. A suspension device in accordance with claim 1, wherein at least one tension bar includes a composite belt comprising a coil of reinforcement fibres formed into unidirectional rovings which are agglomerated into a matrix of rigidified synthetic resin, the composite belt encircling two articulation ball joint supports on the ends of the tension bar for articulating said tension bar on the transmission box and on a structural support of the helicopter structure.

7. A suspension device in accordance with claim 6, wherein the ball joint supports are separated from each other by at least one filling component in a light, cellular or foam material, which is likewise encircled by the composite belt, said belt and said filling body being covered between the two end ball joints by a composite coating which includes at least one layer of reinforcement fibres rigidified by a synthetic resin.

8. A suspension device in accordance with claim 1, wherein each tension bar is articulated by its lower end on a structural support comprising two stops, one of which is a crash stop, restricting the movement of the transmission box towards the helicopter structure by pressing against an area of the corresponding lever in which said lever is articulated on the lower end of corresponding diagonal bar, and of which the other stop is a tension bar rupture stop, and comes to bear against another area of the corresponding lever near the articulations of the lever on the tension bar and of the tension bar on the structure.

9. A suspension device in accordance with claim 6, wherein each of the two end ball joints of at least one tension bar is mounted into one end of one of two coaxial telescopic shafts respectively, at least one of which is tubular, which are fitted into each other by their other end, between two rectilinear strands of the composite belt of the tension bar, with a telescopic movement of the two shafts which is restricted in both directions by at least two stops, at least one of which is a crash stop, restricting the thrusting of the two shafts into each other, the other stop restricting the withdrawal of one shaft out of the other, in the event of the composite belt failing.

10. A suspension device in accordance with claim 9, wherein one of the two shafts has, in their fitted parts, at least one stop pin projecting substantially radially in relation to the common axis of the shafts which is the longitudinal axis of the tension bar, the stop pin being engaged in at least one oblong and axial opening made in the other shaft, the axial ends of which make one a crash stop and the other an extension stop by engagement with the stop pin.

11. A suspension device in accordance with claim 9, wherein one of the two shafts has a radial shoulder forming a crash stop against which the other shaft abuts, following a pre-specified thrusting movement of the two shafts one into the other from an initial position.

12. A suspension device in accordance with claim 1, wherein at least one lever supporting a damping weight includes two rigid flanges parallel to each other and substantially parallel to the rotor axis, braced at least by part of the damping weight and between which extend pivot pins of the articulations of said lever on the tension bar and on the lower end of the diagonal bar, the pivot pins being mounted on the flanges by twin bearings.

13. A suspension device in accordance with claim 12, wherein at least one diagonal bar is articulated on the two flanges of the corresponding lever by a combined ball joint and twin bearing articulation, the ball joint at the lower end of said diagonal bar being passed through by a pivot pin mounted on said flanges by said twin bearing.

14. A suspension device in accordance with claim 12, wherein the lower end of at least one tension bar is articulated on a structural support by a ball joint which is passed through by a pin held on said structural support, and the corresponding rigid lever is articulated pivoting around said pin on the same structural support and at the lower end of said tension bar.

15. A suspension device in accordance with claim 14, wherein the pivot pin pivoting the lever on the structural support and on the tension bar is mounted on the two flanges of said lever by a twin bearing.

16. A suspension device in accordance with claim 1, wherein the upper ends of at least one diagonal bar and of the corresponding tension bar are articulated on the transmission box by two separate ball joint articulations.

17. A suspension device in accordance with claim 1, wherein the upper end of one of the diagonal bar and the corresponding tension bar is articulated to the transmission box so as to at least pivot round a pivot pin passing through an articulation ball joint of the upper end of the other of said tension bar and diagonal bar on the transmission box.

18. A suspension device in accordance with claim 9, wherein the upper end of at least one diagonal bar is articulated to at least pivot on one of the two telescopic shafts of the corresponding tension bar which is articulated on the transmission box by the ball joint of the upper end of said tension bar.

19. A suspension device in accordance with claim 18, wherein at least one rigid lever is orientated substantially along the longitudinal axis of the corresponding tension bar and supports the corresponding damping weight on the upper end side of the corresponding tension bar and diagonal bar, in relation to the articulation of said lever on said tension bar, around a pivot pin moved, substantially along the longitudinal axis of said tension bar, in relation to the ball joint of said tension bar on the structure, and the articulation of the corresponding diagonal bar on said lever being thrown off centre in relation to the longitudinal axis of said lever.

20. A suspension device in accordance with claim 19, wherein the articulation centres of the upper ends of at least one tension bar on the transmission box and of the corresponding diagonal bar on said tension bar and the centre of articulation of the corresponding diagonal bar on the corresponding rigid lever are aligned in a first direction, and the intersection of this first direction with a plane passing through the centre of gravity of the corresponding damping weight and transverse to said rigid lever, being aligned with the centres of articulation of the lower end of said tension bar on the structure and of said lever on said tension bar, in static mode.

21. A suspension device in accordance with claim 1, wherein at least one of the tension bars includes at least one part able to bend resiliently under a tension load which is applied to the ends of the bar, such as a ring and/or an axial part of a progressively open-ended section, giving said bar tensile flexibility.

* * * * *

UNITED STATES PATENT AND TRADEMARK OFFICE
CERTIFICATE OF CORRECTION

PATENT NO.   : 6,164,915
DATED        : December 26, 2000
INVENTOR(S)  : Nicolas Certain It is certified that error appears in the above-identified patent and that said Letters Patent is hereby corrected as shown below:

<u>Title page,</u>
Item [30], delete "April 23, 1998 [FR] France ………. 98 05093" and insert therefor:
-- April 23, 1998 [FR] France ……….. 98 05094 --.

Signed and Sealed this

Nineteenth Day of August, 2003

JAMES E. ROGAN
*Director of the United States Patent and Trademark Office*